Nov. 24, 1936.  L. H. FACER  2,061,567
PROCESS FOR PRODUCING SUPERPHOSPHATE FERTILIZER AND PRODUCT THEREOF
Filed Feb. 2, 1934  9 Sheets-Sheet 1
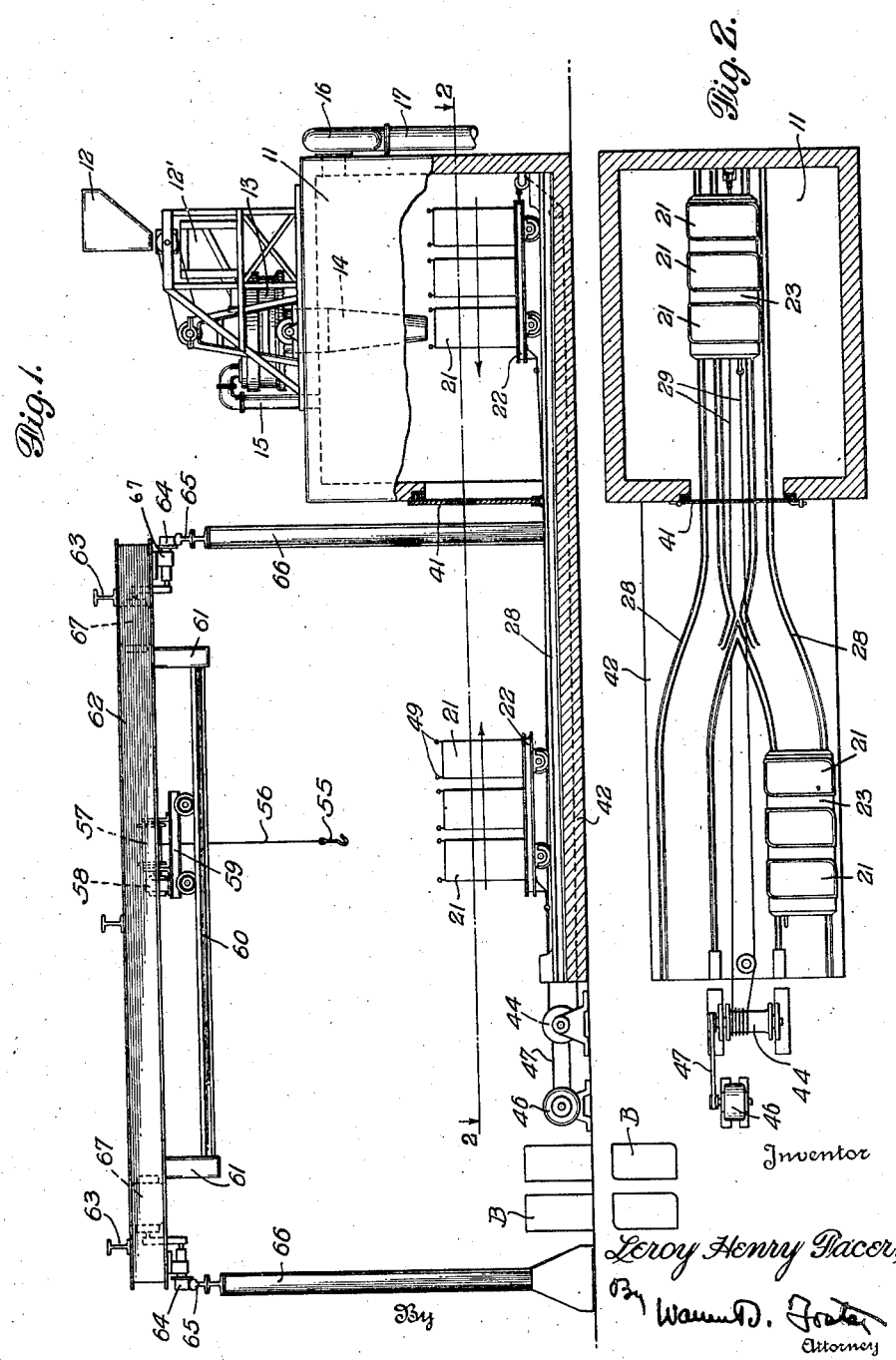
Inventor
Leroy Henry Facer,
By Warren D. Foster
Attorney

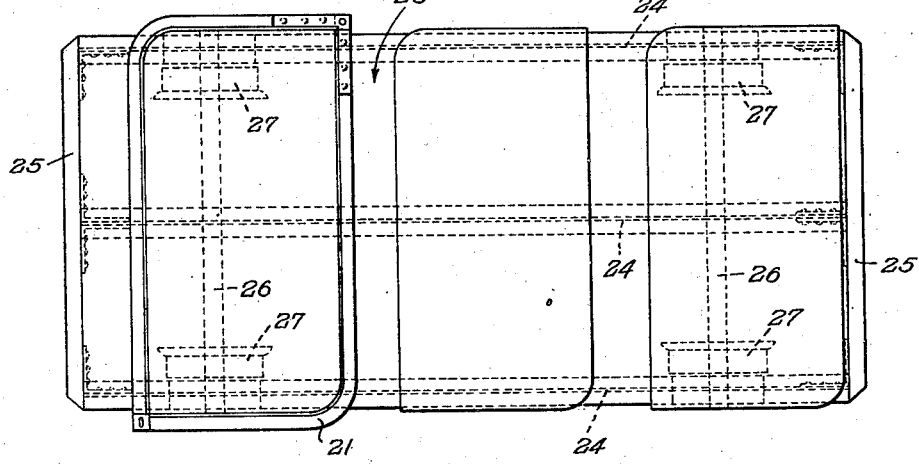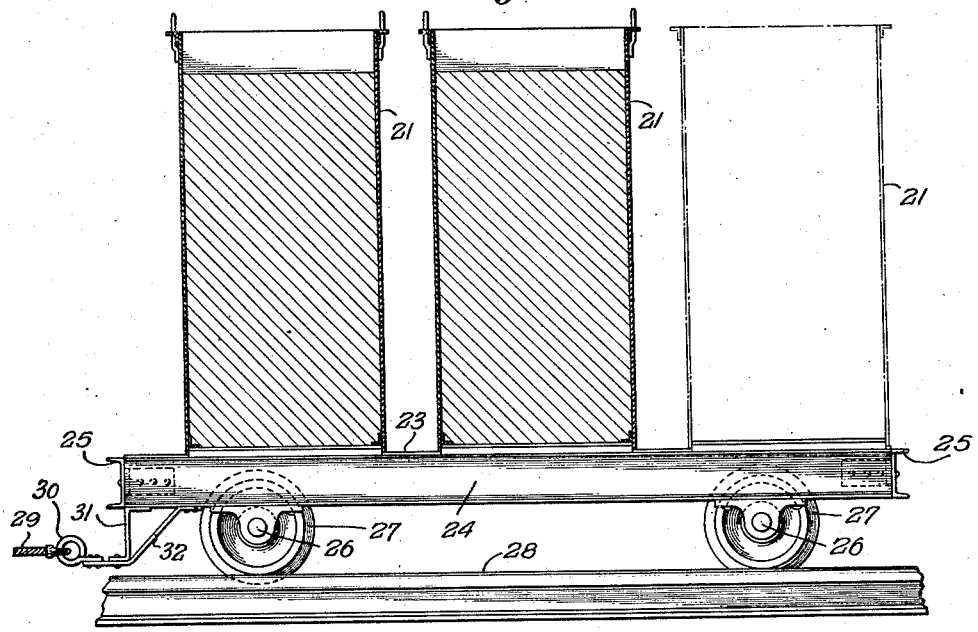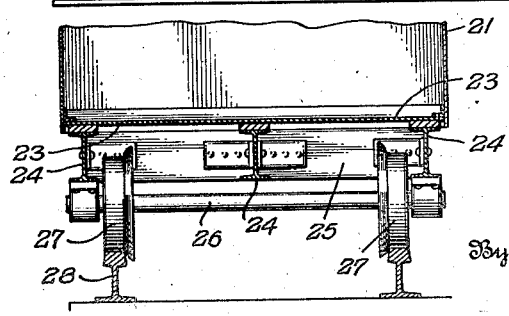

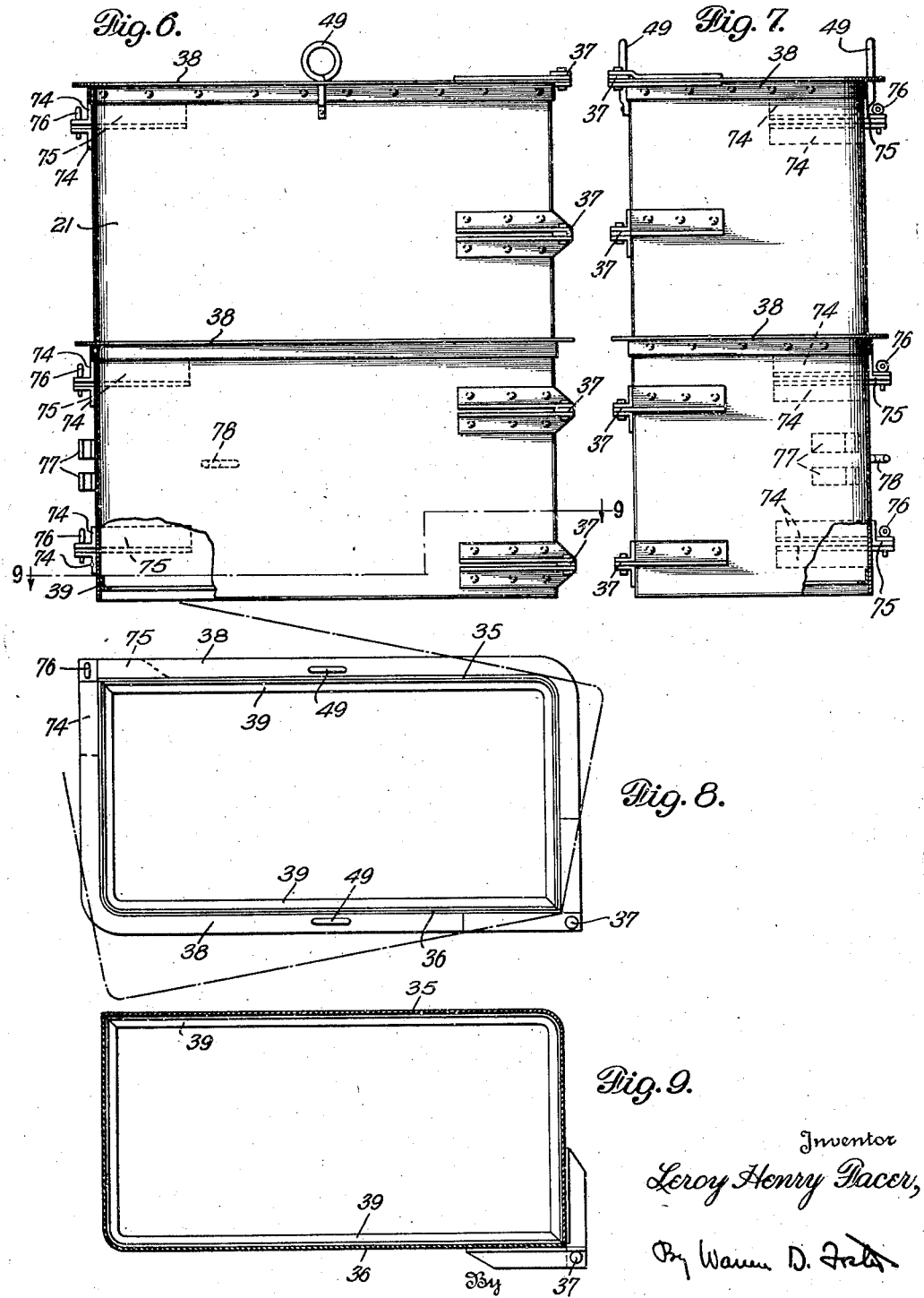

Nov. 24, 1936.  L. H. FACER  2,061,567

PROCESS FOR PRODUCING SUPERPHOSPHATE FERTILIZER AND PRODUCT THEREOF

Filed Feb. 2, 1934  9 Sheets-Sheet 4

Inventor
Leroy Henry Facer,

By Warren D. Foster
Attorney

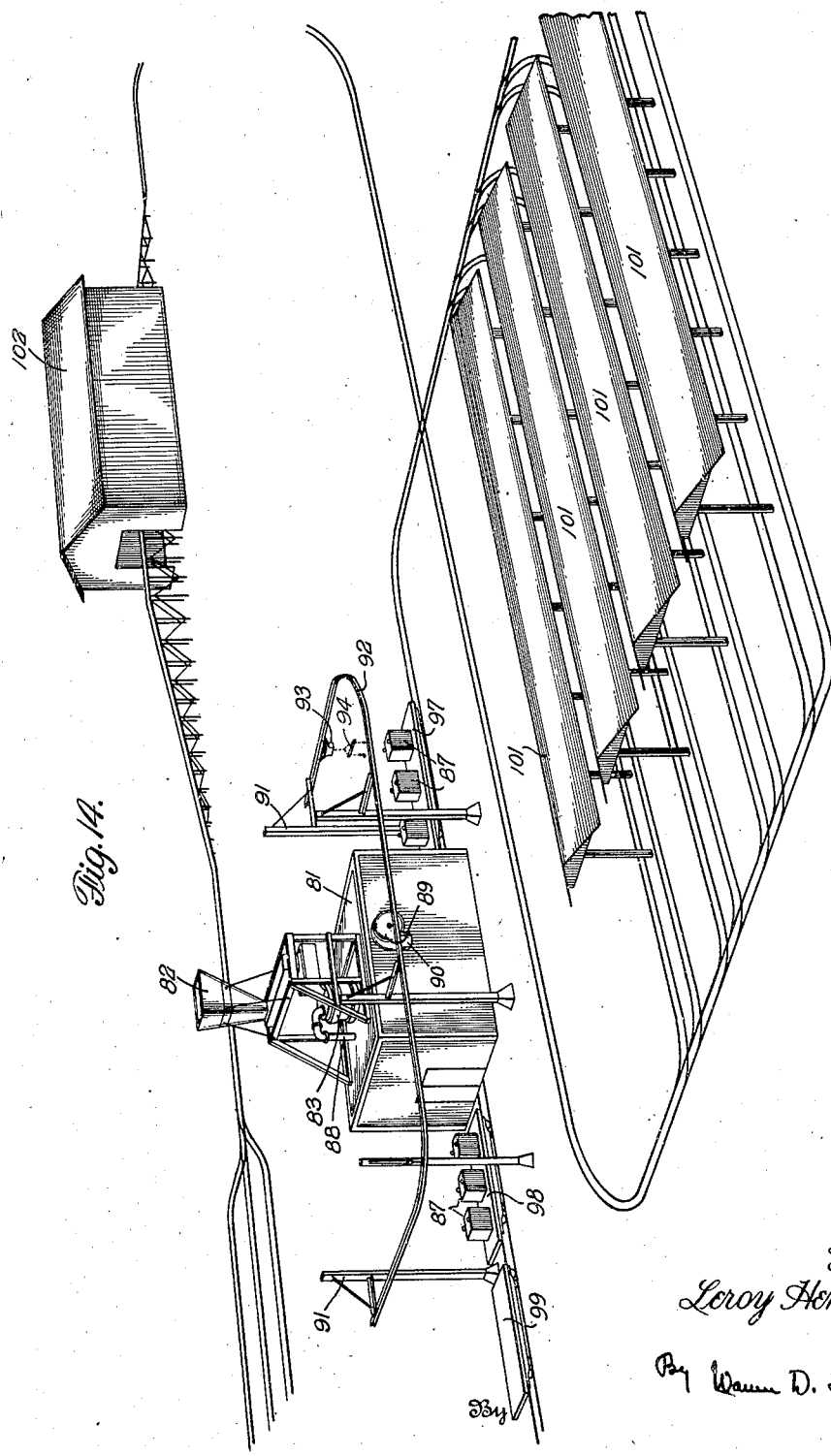

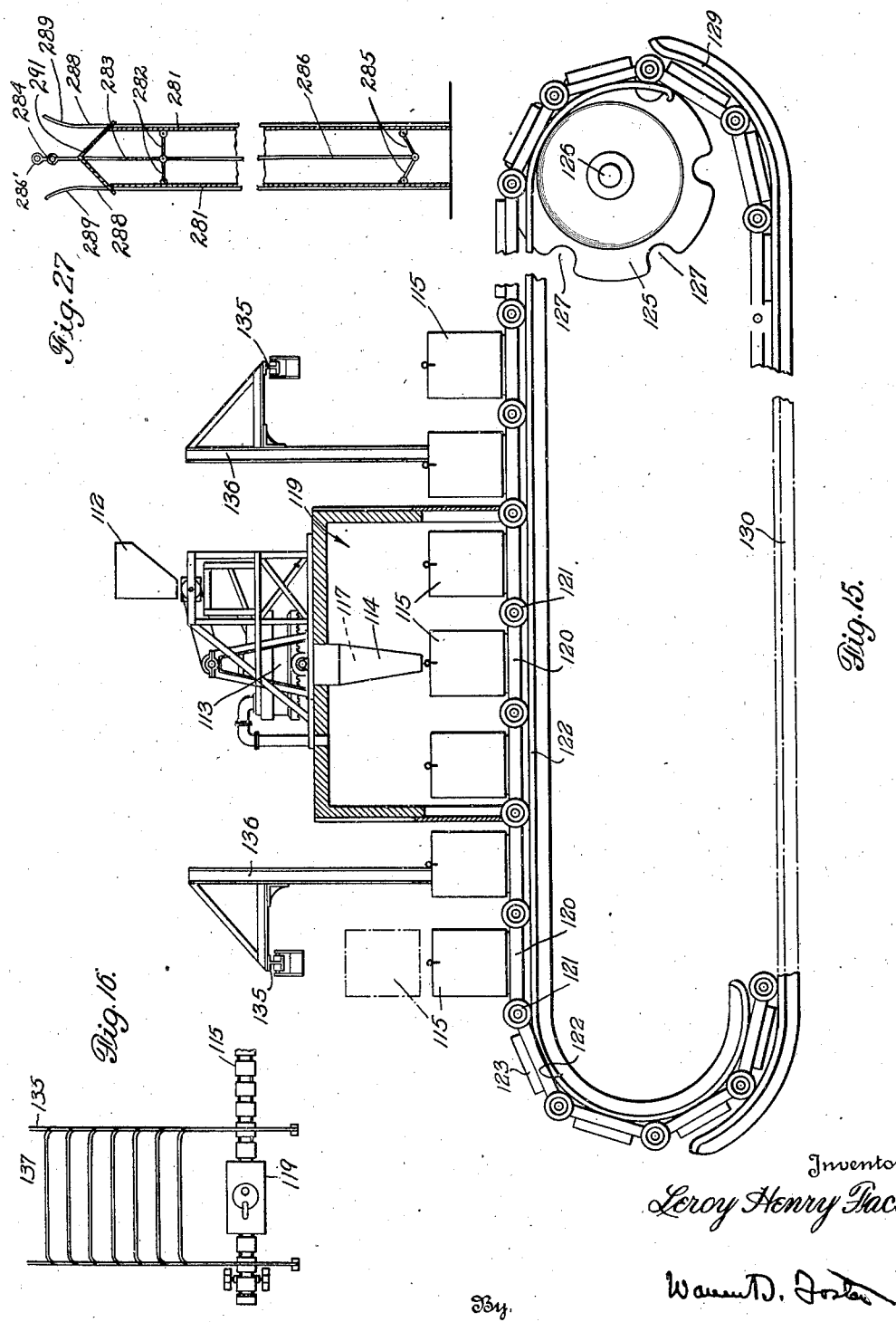

Nov. 24, 1936.  L. H. FACER  2,061,567
PROCESS FOR PRODUCING SUPERPHOSPHATE FERTILIZER AND PRODUCT THEREOF
Filed Feb. 2, 1934  9 Sheets-Sheet 7
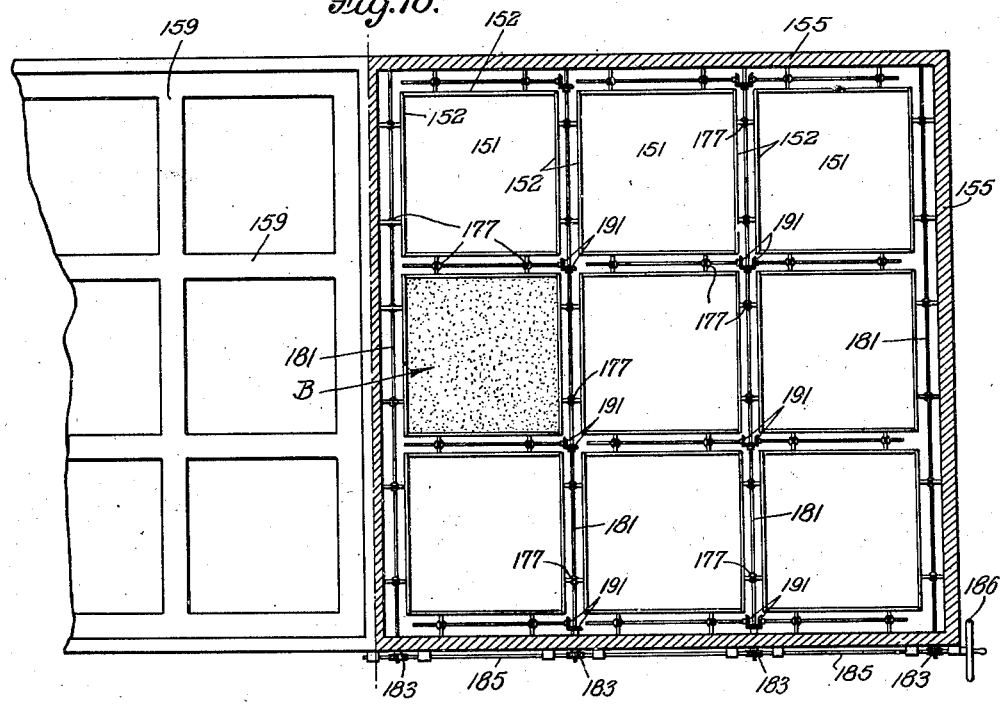
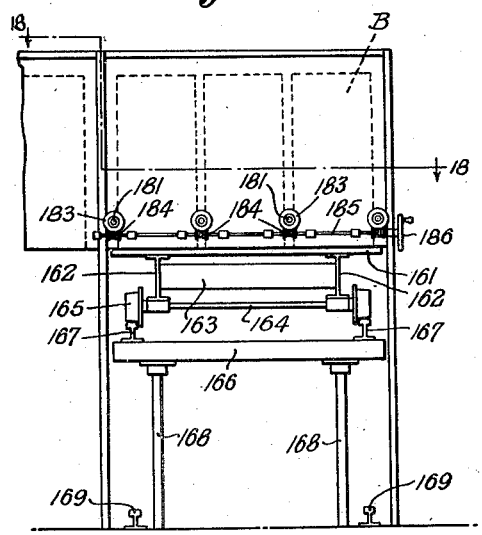
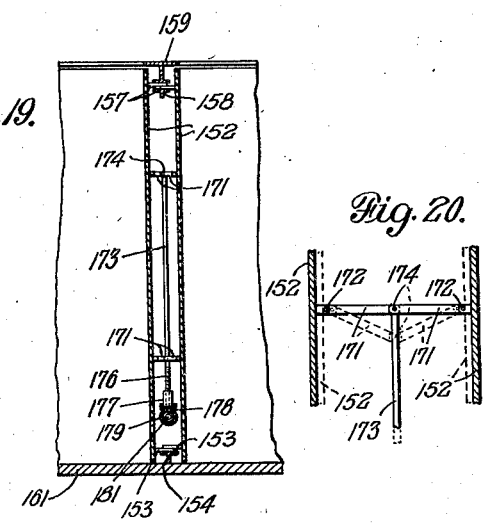
INVENTOR
Leroy Henry Facer,
BY
ATTORNEY Nov. 24, 1936.                L. H. FACER                2,061,567
PROCESS FOR PRODUCING SUPERPHOSPHATE FERTILIZER AND PRODUCT THEREOF
Filed Feb. 2, 1934                    9 Sheets-Sheet 8
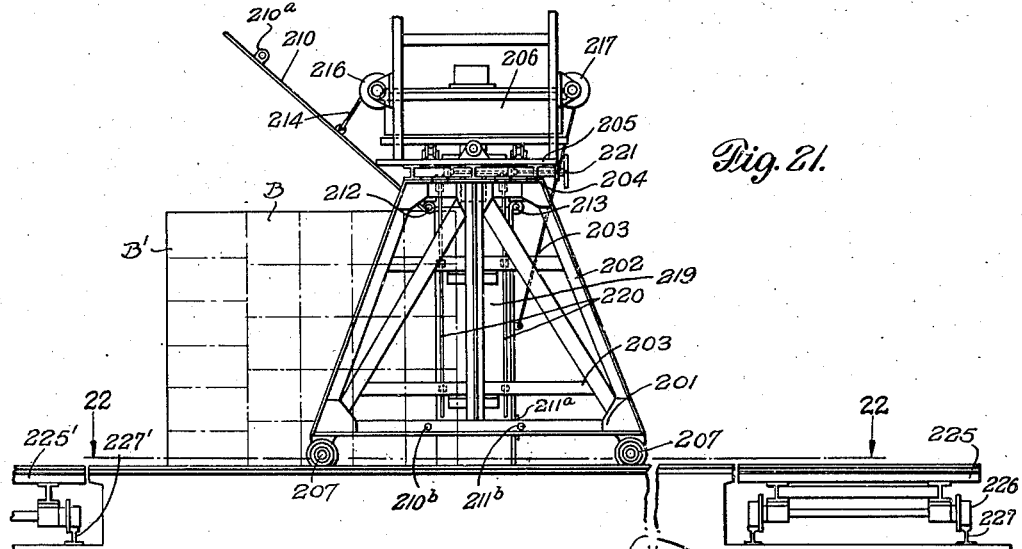
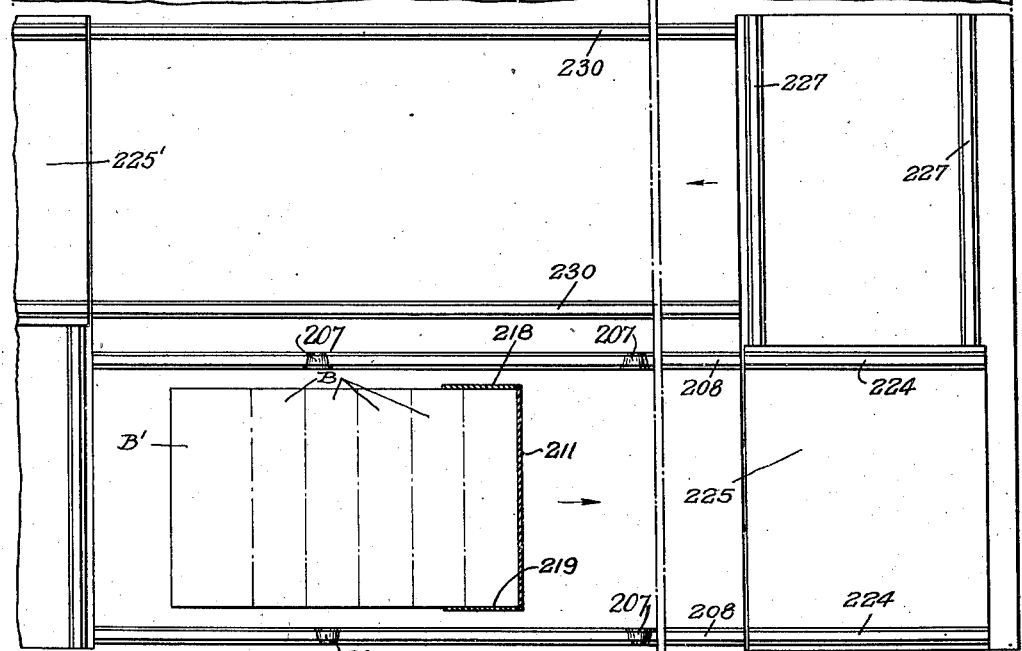
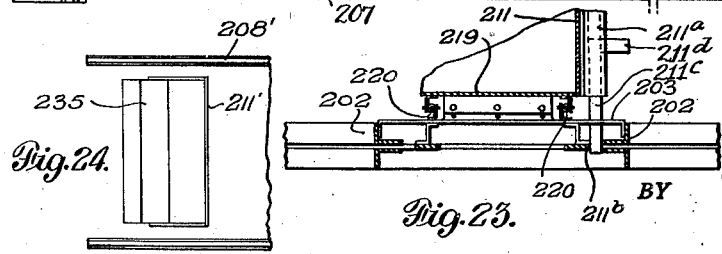
INVENTOR
Leroy Henry Facer,
BY
ATTORNEY

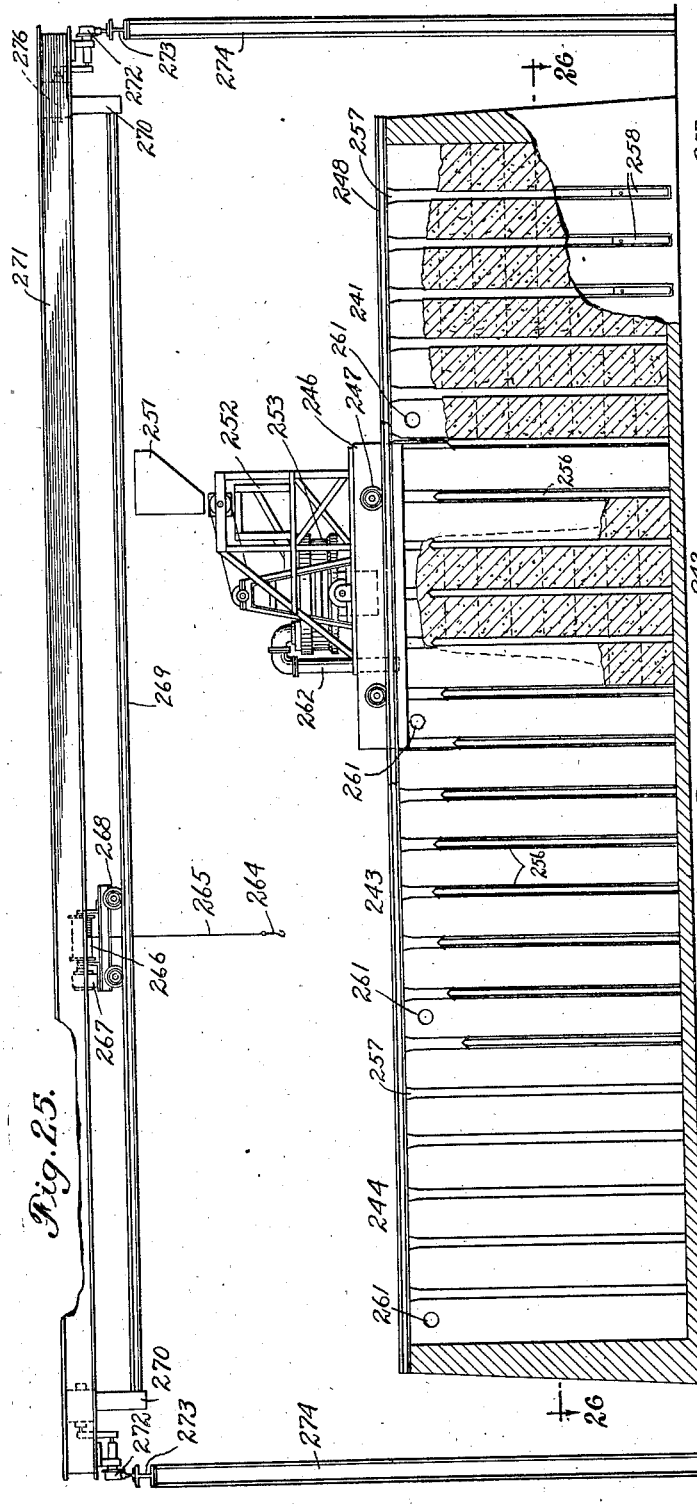
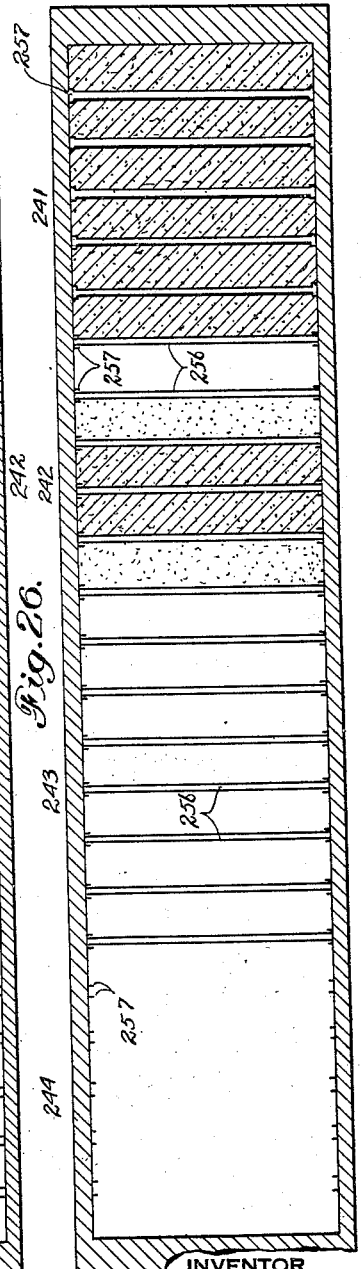

Patented Nov. 24, 1936

2,061,567

UNITED STATES PATENT OFFICE 2,061,567

PROCESS FOR PRODUCING SUPERPHOSPHATE FERTILIZER AND PRODUCT THEREOF

Leroy Henry Facer, Phelps, N. Y.

Application February 2, 1934, Serial No. 709,411

43 Claims. (Cl. 71—49)

For many years manufacturers of fertilizers, particularly superphosphate, have sought to obtain a more granular and free drilling product. To this end various complicated and expensive methods and devices have been proposed. I have succeeded in securing a highly granular and free drilling superphosphate both alone and in combination with other fertilizing materials. I have accomplished this result by novel methods which, instead of adding complications to the conventional process, have made it quicker, more simple and less expensive.

A primary object therefore of my invention is to produce a material which is better adapted to serve as the basis for a complete fertilizer, as well as a superphosphate fertilizer, which better meets the farmer's needs, and to do so at a saving in the cost of manufacture and equipment.

My invention may be applied to the production of superphosphate alone, or, as I manufacture the superphosphate by acidulating phosphate rock, I may then add other fertilizering elements, notably nitrogen and potash, thus producing a two-element or even a complete (three-element) fertilizer at one operation. For simplicity, I describe my invention as for the manufacture of superphosphate, but it must be understood that if desired it is possible to mix the potash-bearing or nitrogen-bearing ingredients or other fertilizer materials with the phosphate rock and the acid. It is of course understood that phosphorus as it appears in phosphate rock is not readily soluble in the soil and hence not quickly enough available as a plant food. Acidulation, as has long been well known to those skilled in the art, turns the unavailable phosphorus of the phosphate rock into a form of phosphorus which can be readily assimilated by the plant.

In all forms of my invention, I produce the fertilizer by mixing the phosphate rock and acid in a pan or mixer in the usual way, preferably with the important exception of using a more concentrated acid than is customary with most superphosphate manufacturers. After the mixing of the acid and ground phosphate rock is complete, I pour the slurry mass into a den. By my use of the term "mixing" I refer to a normal mixing operation which is accompanied by an active chemical reaction between the rock and acid. Such mixing presupposes, particularly in the winter, the use of warm acid, according to the present conventional practice. By "den" I mean a receptacle which will retain or support this mass until it solidifies into a block. Under some conditions, this receptacle may be formed at least in part by a previous batch of the superphosphate itself. This den may be of any size which is convenient from the standpoint of the mechanical equipment of the plant as a whole. The den may be of such size as to hold one or many charges from the mixer. Under my process the resulting product is in no way changed so far as I can observe whether I make use of many batches to each den or merely one.

After I have formed the superphosphate into a block by pouring it into a den, I leave that block absolutely untouched, except by the floor and walls of the den, until curing has been completed, except as noted hereinafter. By "complete curing", I mean a curing process which has progressed to the point at which it meets the following tests:

1. The chemical reaction between the rock and the acid has reached such a point that no noticeable heat is being generated and the block as a whole has cooled;
2. Availability has reached a high degree, but will slowly increase;
3. Crystallization has sufficiently progressed so that the material upon the disintegration of the block will be characterized by pellet formations;
4. The material, after the blocks have been broken up, when placed upon a pile will not generate noticeable heat.

A literally "complete curing", from the laboratory standpoint, will take an indefinite period and is beyond the scope of a commercial operation. On the other hand, my use of the term "curing" must not be confused with its use by others to mean merely drying the mass, or permitting the mass to dry, sufficiently to permit handling by usual mechanical equipment.

As soon as the den has been filled with the desired mixture so that a block is formed therewithin, I may either move the den from the block or the block from the den. In either case, I do not touch the walls of the block, as by cutting, slicing, stirring, shovelling, pushing, or pressing, or otherwise. Any such action tends to defeat a prime object of my invention. I leave the mass of superphosphate absolutely without treatment from the time immediately after it has been formed until curing is complete. I rely upon the natural characteristics of the material itself to accomplish what others accomplish by expensive apparatus.

Much ingenuity and effort have been expended previously in retaining the gases formed by the chemical reaction between the phosphatic material and the acid within the den or within a specially constructed container, under the theory that the presence of the gas, and in some cases under the theory that the presence of the heat, accelerate the curing process and result in an ultimately better product. I too make use of the same theory but without the use of any especial equipment whatever.

When phosphate rock is treated with sulphuric acid, for example, the reaction between the rock and the acid is much accelerated by heat. Increase in the concentration of the sulphuric acid is not of service at this point of the process, since a larger quantity of a dilute sulphuric acid is as active as a corresponding smaller amount of a concentrated sulphuric acid, within reasonable limits. Heat and pressure are increased if the steam and other hot gases are not allowed to escape. When sulphuric acid is mixed with phosphate rock, phosphoric acid is comparatively quickly produced and completion of reaction between the rock and the acid takes place with this phosphoric acid. Phosphoric acid unlike sulphuric acid does not need other than normal temperatures for performing its function in the manufacture of superphosphate. Unlike sulphuric acid, however, it operates much more effectively when concentrated than when weak. Under my process I take advantage of these peculiarities of the chemical agents which are commonly employed. I prefer to use a more concentrated sulphuric acid than is normal and until the sulphuric acid has been followed by phosphoric acid I maintain a very high temperature and do not permit the easy escape of the gases. The use of a concentrated sulphuric acid produces a concentrated phosphoric acid. After the sulphuric acid, however, has been followed by phosphoric acid, the greater concentration of the phosphoric acid makes its operation very much quicker than that which is conventional. I can use a relatively dilute acid, however, although thereby retarding the time of curing and of drying.

To retain the heat during the first part of chemical reaction, I do not make use of elaborate apparatus, as has been previously proposed, but instead take advantage of the characteristics of the mixture itself. I have found that if at one time I pour into a den or form a batch of the mixture which has a depth of approximately three inches or less I do not obtain maximum results. Similarly if I pour an amount of the mixture which gives a depth of over approximately three feet the resulting mass is not up to my standard of porosity. Any intermediate depth, however, irrespective of the surface area, is highly satisfactory. The exact depth of each pour or batch will vary with the concentration of the acid and the fineness of the grinding of the rock. I find that by pouring within the above stated limits I secure an initial temperature in the mass of from 15 to 20 degrees Fahrenheit higher than the highest den temperature which can be secured with the conventional means. With my method, the initial den temperature is from 235° to 240° as against 220° as a maximum in the regular process without the use of special mechanical means for increasing or retaining the heat. It will of course be realized that temperature and gas pressure increase in proportion.

I retain this increased temperature and pressure merely long enough for it to accomplish its desired result during the initial period during the change of the sulphuric acid to phosphoric acid. Concomitantly with the completion of this change I permit the heat to decrease relatively rapidly, again without the use of special mechanical appliances. Because of the excellent insulating quality of the material itself, the cooling process although begun relatively early in the process, may extend over a period of some days. I have found that the retention of this heat after its period of usefulness has ended prevents the formation or preservation of the desired granules and may actually cause a decrease in availability.

It must be understood that if the mixture is poured so as to form layers of less than three inches in thickness and the other teachings of this application are followed, the resulting product is better than that formed according to conventional processes although it has less availability in a given length of time and a less durable granulation than the product made in layers of more than three inches. When each batch is poured to a thickness of over three feet I secure the high degree of availability which characterizes a product made according to this process, but owing to the greater weight of the mass the individual particles are smaller.

My process, as described herein, results in a higher ratio of availability. I use relatively less acid. Moreover, I produce that availability very much more quickly, and without the use of special and expensive equipment. By "maximum availability" I mean the largest degree of availability under my system which is practicable under the then present manufacturing conditions as distinct from those existing in a laboratory where the point of view is theoretical rather than commercial. It will of course be understood that such degree of availability must be sufficient at that time to render the product commercially saleable.

It is of course recognized that an exact understanding of what goes on in the manufacture of superphosphate is necessarily difficult. My explanation, however, of the excellent results which are obtained by pouring the mixture within the above stated limits is simple. The phosphatic material itself is an excellent heat insulator. If I pour less than three inches there is insufficient mass to hold the heat during the critical period during which the slurry mass is solidifying. If on the other hand I pour the mass to a depth of more than about three feet the weight of the material is so great that the particles are too firmly pressed together. I find, however, that after each layer has solidified for even the short length of time which is necessary for the mixing of another batch, it is quite ready to support the additional weight of successive batches.

Hereinafter, for purposes of illustration only, I describe several forms according to which my invention may be practiced.

In one of these forms, immediately after the den has been filled with the mixture of phosphate rock and an acid, with or without other elements added thereto, I may bodily move the den as promptly as possible to the point at which I wish to store the material. My movable dens are preferably made without either top or bottom, the contact of the mass within the den with the sides thereof being sufficient to retain the mass within the den. I place the den in any one of several preferred forms, as hereinafter described, upon the spot at which the curing and storage is to take place.

When I have placed my movable den upon the spot at which the curing and storage operation is to take place, I bodily remove the walls of the den from the block of superphosphate formed therewithin. Then this particular den is ready for a succeeding batch of the material. From that time until the actual disintegrating for the purpose of bagging, loading, or mixing with other materials, I may leave the block of superphosphate material absolutely alone. I do not dry it.

It will be noted that my use of a relatively decreased amount of water makes the natural drying of the product very much easier since there is less moisture to be removed by natural crystallization or evaporation. When I so leave the block of superphosphate, its temperature is considerably higher than it would be under ordinary den methods. This temperature is higher at this point because of the thickness of the batch in which the mass is originally poured, as previously pointed out. It remains higher, because of the excellent insulating qualities of the material itself, when permitted to remain intact, and its ability to maintain pressure within its intercellular structure.

According to the methods used by others, elaborate and expensive drying processes are carried out to shorten the manufacturing process. I merely permit the curing to be completed without any artificial drying or handling whatever. The curing time under my process is so shortened that no artificial drying or handling is required. In a very few days from the time in which the mixture is poured into the den, it is ready for shipment.

Alternatively, I may place the filled den upon a flat car, remove the den from the block, and while the den is sent back to the filling room for another charge, move the car bearing the block or blocks to a place of storage.

According to another plan, I may use an intermittent or continuous conveyor for carrying the dens through the filling room, pick up the dens as by a monorail hoist from the conveyor outside of the filling room, unload them at the point at which the blocks are to be stored, and immediately again use the dens. Or I may place a den with slightly movable walls above a flat car which, upon the movement of the walls to free the block, may be bodily lowered to clear the dens, taken to the place of storage, another car brought into place, and the process repeated.

Particularly when my process is to be introduced into an existing plant, I may prefer a form of my invention wherein the mixing and den unit is bodily moved away from the mass, immediately after it is solidified, thus leaving the superphosphate for curing and storage at the point at which it is formed.

Alternatively I may make use of a den of conventional form, as in an existing plant, by forming successive batches of the mixture into a plurality of blocks within such conventional den, these blocks being divided from each other as by double removable walls so that the desired rapid cooling may be carried out after the original high heat has served its purpose during the initial portion of the chemical process.

It will be noted that in each form of my invention, in those cases in which I wish to secure my pelleted product I leave the mass absolutely untouched and untreated from the time at which it is formed to the time at which curing is complete and it is ready for mixing, if desired, or shipment.

It is to be noted that as the result of my invention, I produce a product which is entirely dissimilar to any which has previously been secured, so far as I am aware, without an additional and expensive manufacturing process. At the conclusion of my process, the superphosphate is largely in the form of pellets. By "superphosphate pellet" I mean a small, somewhat rounded, mass which is a group of superphosphate granules held tightly together by the material itself. At some point in every process for making superphosphate the material is granular in structure. Great efforts have been made by many manufacturers to avoid breaking down this granular structure during curing, storage, or other handling. I have retained this granulation and gone a step farther. I retain this granulation, and in addition I produce a product in which the granules themselves are naturally cemented to other granules, thus producing a much larger pellet than has heretofore been produced by any natural means. In the past, pellets have been formed in superphosphate, after the manufacturing process in its chemical and other physical aspects has been completed, by re-puddling and re-forming the mass, but pellets so formed are different from those which result from my process. In other words, pellets have been secured in the past only by adding an extra and expensive step to the normal manufacturing process. Alternatively, the green superphosphate is stirred and dried in its early stages thereby stopping the curing process and yielding a product of low availability although in coarse granular form. The pellets which I secure without any additional step in the process, however, have very different and superior qualities. Pellets secured by my process are more porous, more bulky, and better meet the demands of the trade. All other pellets previously formed in the art have been at the expense of bulk. That is to say, they have resulted from a compacting of the mass, which is highly undesirable from the standpoint of the trade. I secure pellets which weigh less per cubic foot than the ordinary non-granular superphosphate to say nothing of the granular re-puddled product. According to my method, therefore, I secure better and different pellets than any previously known in the art as the result of the regular steps in my process which are no more in number and are less in expense than those in the conventional processes.

Other advantages, objects, and characteristics are apparent from the following description, the attached drawings and the subjoined claims. Although I am showing preferred embodiments of my invention, it will be readily understood that I am not limited to this particular construction as changes can be readily made without departing from the spirit of the invention or the scope of my broader claims.

In the drawings:

Figure 1 is a side view partly in section and partly broken away of a preferred form of my invention.

Figure 2 is a view taken on the line 2—2 of Figure 1 looking in the direction of the arrows.

Figure 3 is a top plan view of moveable dens and a car upon which they are placed in accordance with certain forms of my invention.

Figure 4 is a side view of the same, and Figure 5 is an end view of the same.

Figure 6 is a side view showing in some detail a preferred form of the movable den, Figure 7 is an end view of the same, Figure 8 is a top plan view of the same, and Figure 9 is a view taken upon the line 9—9 of Figure 6 looking in the direction of the arrows.

Figure 14 is a view largely diagrammatic showing another preferred form of my invention.

Figure 15 is a similar view partly in section showing another preferred form of the invention as applied to a continuous process.

Figure 16 is a diagram showing the movement of the dens or forms, and the operative steps in my process when carried out continuously.

Figure 17 is a view of another modification of my invention in which the walls of a plurality of forms are articulated so that they move away from the blocks of superphosphate after they have been formed, the blocks then being bodily removed intact by the lowering of a car the floor of which supports the blocks. The car is then removed to any convenient point, for the storage of the blocks.

Figure 18 is a top plan view partly in section taken along the line 18—18 of Figure 17, looking in the direction of the arrows, certain parts being omitted for clarity.

Figure 19 is a detailed view taken on the line 19—19 of Figure 18, looking in the direction of the arrows showing means for moving or "cracking" the den walls.

Figure 20 is an enlarged detailed view of a toggle joint which may be employed to move the den walls away from the blocks of superphosphate.

Figure 21 is a side elevational view of a preferred form for carrying out my invention in which the den and mixing structure is bodily movable away from the mass of superphosphate manufactured thereby, the superphosphate remaining in such mass until curing has been partially completed.

Figure 22 is a section taken on the line 22—22 of Figure 21.

Figure 23 is an enlarged fragmentary view of means for moving walls of a den embodied in such a movable structure, and Figure 24 is a top plan view of a variant of Figure 22.

Figure 25 is a side view partially in section with certain parts omitted for clarity showing another way in which my invention may be practiced, making use largely of existing structures.

Figure 26 is a section taken on the line 26—26 of Figure 25 looking in the direction of the arrows.

Figure 27 is a detail applying to Figures 25 and 26.

Figure 10:
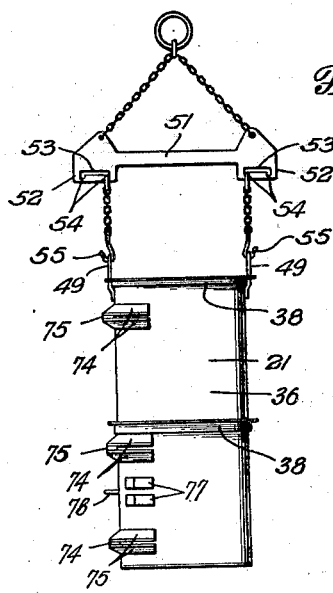
Figure 10 is an end view of one of my movable dens being lowered into position.

In a preferred form for carrying out my invention I may provide a filling room 11 upon the top of which I mount a rock-receiving hopper 12 into which ground phosphate rock is introduced and passed by way of a scales hopper 12' into a mixer or pan 13 into which sulphuric or other acid and water are introduced in the desired proportions. When I make use of more than one fertilizer material, I divide the hopper 12 into a plurality of parts, one for each material. If my process is applied to an existing plant which uses the conventional large den, this filling room may be readily formed from the den, with very little reconstruction. I find that I am able to produce my improved form of superphosphate by restricting the moisture content to as little as 7½% of the mix upon the removal of the form but on the other hand I find that I can secure satisfactory results by using the conventional proportion of 12 or 12½%. A great advantage of my method is that I can fully utilize a more concentrated acid. I trap and hold a larger amount of the steam which is caused by the chemical reaction. The steam turns to water, which is essential to carry out the chemical reactions. After the mass has been mixed as is conventional in the art, it is introduced into my movable dens by means of a funnel 14. The gas from the pan is withdrawn by means of a pipe 15 leading into the filling room which in turn is exhausted by a fan 16 through a pipe 17.

The mixture thereupon flows into one of the movable dens 21 which, with a convenient number of other dens, is mounted upon the car 22, which is fully shown in Figures 3, 4, and 5.

A floor 23, preferably of sheet steel, may be mounted upon longitudinal I-beams 24 and transverse beams 25. Axles 26 are journalled in any convenient manner to the beams 24 and support wheels 27, which run upon rails 28. The cars may be drawn as by a cable 29 attachable to an eye-bolt 30 which is supported as clearly shown in Figure 4 by bracket members 31 and 32.

Each movable den is very simply constructed, as will be seen best in Figures 6, 7 and 8, and consists primarily of merely two right-angled side members 35 and 36, each forming a side and end wall respectively of the den and hinged in any convenient manner as at 37. Angle iron reinforcements 38 give the necessary strength to the structure. An angle iron 39 which passes about the base of the den both reinforces the den structurally and in a certain form of my invention has another purpose which will later appear.

It will be particularly noted that in the practice of this form of my invention I provide no bottom or top whatever to the portable den. As an alternative form, I may make use of an angle iron near the bottom of the den but placed upon the inside in order to give a slight point of support to the mass within the den as the den and the mass therewithin are bodily lifted and moved. I find, however, that such support is generally unnecessary, particularly in view of the fact that the rivets or bolts which hold the angle irons and hinges to the side pieces 35 and 36 extend slightly within the mass and assist in holding it within the den. If I make the mixture sufficiently dry, however, as can readily be done, it is entirely possible to practice my invention with a den which has entirely smooth inside surfaces.

As will be noted from Figure 2, I provide two independent tracks running within the filling chamber 11 and extending out through a doorway 41 to an unloading platform 42. In this form of my invention I provide a separate track for each car. To move the loaded cars in and out of the filling room, I provide a drum 44 which may be operated by a motor 46 through the belt 47. Simply reversing the motor pulls the car in or out at will.

Figure 11:
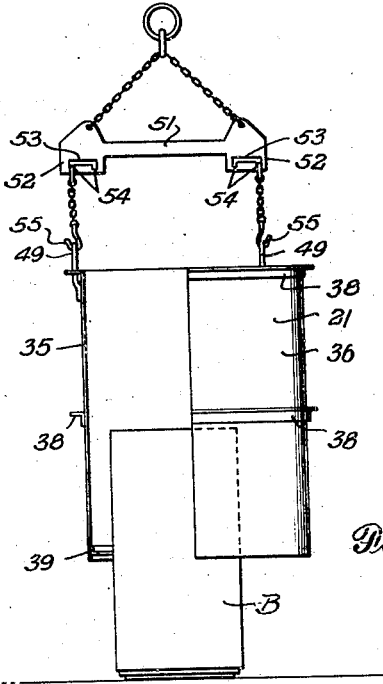
Figure 11 is a similar view, but showing the movable den being raised with the sides in extended position after the block of fertilizer has been placed upon the floor of the storage space.

As a point of attachment for raising the movable dens from the floor of the car, I provide a set of heavy eyes 49. As will best be seen by reference to Figures 10 and 11, I provide a yoke member 51 which has two depending structures 52 added thereto or formed integrally therewith, provided with slots 53 and indentations 54 for the selective reception of rings 54' to which the hook members 55 are attached by chains. These hook members may readily be placed within the eyes 49 of the movable dens. For purposes presently to appear, it is necessary for these hook members to be selectively disposable in relatively near and relatively distant positions to each other. A cable 56 attached to an electric winch 57 operated by a motor 58 placed upon a car 59 which runs upon a track 60 of a crane is operable for raising and lowering the dens. This track 60 depends by means of supports 61 from I-beams 62 joined as by I-beams 63. The I-beams 62 operate upon wheels 64 which run upon rails 65 which are supported as by upright beams 66. Motors 67 are operable to move the entire crane structure in directions at right angles to the tracks 28, while the car 59 is operable to move the movable dens in a direction parallel to the longitudinal axis of these tracks. It will be entirely understood therefore that by means of this crane the dens 21 may be lifted from their cars and moved to any convenient point upon the floor.

The operation of this form of my invention is as follows:

The ground rock, with or without other fertilizing elements, passes from the storage hopper 12 to scale hopper 12' and into the pan 13 where it is mixed with an acid. As later pointed out, however, these other fertilizing ingredients may be added to the pan later. As soon as the mix is complete, it is poured into the first of the dens or forms 21 placed upon the car 22. When this form is filled with as many batches as are convenient, preferably of a depth of between three inches and three feet at each pouring, the car is moved forwardly until the next den is placed under the spout 14 and this den in turn is filled. Thereafter the other den or dens upon the car are likewise filled. For purposes of convenience, I show a car with a capacity of three dens but it will be understood that economy of handling will determine the number of dens which are to be placed upon each car. The filling room should be sufficiently large preferably to support the mixing machinery on its top and to hold a car upon which the dens to be filled are mounted. After the dens are filled, the car is pulled out upon its own track and while the crane is removing the filled dens from the first car, the other car is placed within the filling room and the filling process is repeated. The crane picks up each den in turn and passes it to any convenient spot upon the floor. Thereupon the den is "cracked"—that is to say, the sides slightly separated from the block within.

Figure 12:
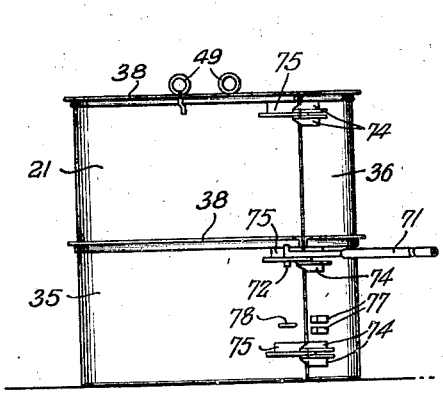
Figure 12 shows the construction of the den opening or "cracking" device and Figure 13 is a top plan view of the same showing the "cracking" lever applied—that is to say, the lever by which I move the sides slightly away from the mass within, as shown in Figure 11, and in dot-and-dash lines in Figure 8.
Figure 13:
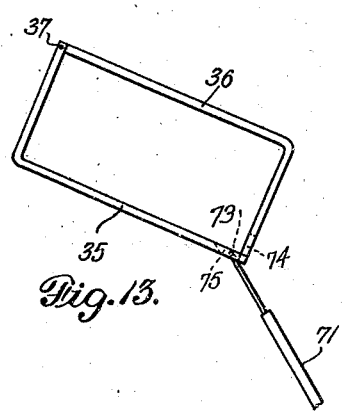

Figures 12 and 13 show a method which may be used in "cracking" the dens. I preferably employ a relatively long handle or lever 71 in an end of which I provide formations 72 extending normally therefrom and forming a T-shaped structure therewith. To hold the form in closed position, I employ any suitable locking device. The one which I show herein for purposes of illustration may comprise the paired angular members 74 and 75 which may be maintained in closed relation by a pin 76. I preferably position a pair of the members 74 in such relation to an opening 73 in one of the lever-receiving members 75 that they will serve as a convenient fulcrum for the lever 71.

The operation of this portion of my device will be clear from the foregoing description. After having removed the locking pin 76, a workman places the T-portion of the lever so that one right-angled prong fits into the opening 73 in one of the angular locking members 75 and the other bears against the member 38. He then pulls the handle of the lever 71 away from the den. The leverage is so great owing to the length of the handle that it is a relatively easy matter to separate the sides from the mass therewithin and from each other.

After the den has been "cracked", the den is lifted free from the block. Before the filled den is lifted, the hooks 55 are positioned in the notches relatively close to each other, but after the den has been lowered, placed at rest at the place where the block is to be stored, and "cracked", the hooks are moved to the notches relatively distant from each other and moved toward the outside of the yoke. Thereupon, as the yoke is lifted by the crane, the sides swing out from the block B of the superphosphate and do not touch it. The den is placed upon a car for a repetition of the process. To close the den, the workman places the T-end of the lever in the protruding slot-carrying member 77, hooks a chain to the hook 78 and the lever, and pulls the den sides together, at which time the locking pieces 76 may be dropped into place. The blocks remain at the point at which they are left until they are cured. After the curing is completed, the time element which elapses before they are used is a matter solely of business and not of the process. The curing takes a very few days. There is no drying as such; that is to say, there is no separate drying operation. After the blocks are cured, they may be broken up and/or placed in large storage piles without destruction of the pellet form.

Figure 14 shows a modified form of my invention which is particularly suited for larger operations or for plants which are newly built especially for my process. A filling room 81 is provided, if desired as an independent building, and a usual receptacle 82 for the dry materials leading into a pan or mixer 83, which discharges into movable dens 87. As previously described, the gases may be exhausted from the mixer through a pipe 88 into the filling room and from the filling room by the fan 89 and a pipe 90 to some convenient point.

A monorail hoist supported as by the members 91 and embodying the monorail 92, the crane 93, and the yoke 94 may be provided. As shown in Figure 14, one car 97 containing the three filled containers 87, has emerged from the filling room, a car 98 loaded with empty containers is about to be moved into the filling room, and an empty car 99 is provided ready for the containers which are about to be removed from the car 97. A light tractor or locomotive may be used to move the cars.

The track which goes through the filling room 81 may lead to various storage sheds 101 and from the storage sheds back to the track which enters the filling room and also to a shipping and mixing plant 102. From this plant, a track may lead to a second siding for empty cars which in turn connects with the original track which leads into the filling room. Especially in the South, and for manufacturing operations in the North except during the winter, the storage sheds need have no side walls. For winter production under extreme cold the chilling of the outer portion of the block injures the mechanical condition.

The method of operation of the above modification of my device will be readily understood from what has gone before. A car loaded with empty forms is placed within the filling room and each of the dens is thereupon filled. The car is then removed from the filling room to convenient points beneath the monorail hoist, each den is "cracked", the den lifted off the block, and the empty den is moved around to the next car which is to enter the filling room. Consequently, a relatively small number of dens may be used to take care of a relatively large production of superphosphate. The car with the blocks of superphosphate upon it is then moved to an appropriate place within the storage shed where it remains until curing is complete or until the superphosphate thereon is needed for shipment or mixing. At this time this car, with the blocks upon it, is moved into the shipping and mixing plant where milling is carried out and if desired the product shipped or mixed and then shipped. The empty car is placed upon the siding until it is needed for a further operation. It will of course be understood that if desired the block of superphosphate when cured may be removed from the car for pile storage if desired, but since the cars are inexpensive relatively to the cost of handling, I generally prefer to handle the superphosphate only once. According to this exemplification of my process, as will be readily understood by those skilled in the art, the block of superphosphate once it is formed need not be touched or treated in any way until it is placed within the clod breaker just preparatory to shipment or mixing and shipment.

Figure 15 shows another modification of my invention which is particularly suited to a continuous process. The phosphate rock is moved through a receiving receptacle 112 to the pan or mixer 113 and through the funnel 114 into the bottomless forms 115 which may be constructed as previously described. An exhaust fan 117 in the funnel 114 removes the gas from the filling chamber 119. The forms 115 are mounted upon a continuous movable linkage 120 operating by means of wheels 121 upon a track 122. Mounted upon the linkage 120 are bottoms 123 upon which the movable dens are placed. To move the linkage 120, relatively large sprockets 125 are mounted for rotation upon an axle 126 which may be driven in any appropriate manner. The wheels 121 engage with sockets 127 in the sprocketed wheel in order to move the linkage. Upon the under side of the mechanism a trough-like structure 129 is provided to guide the wheels 121 as they move to the lower track 130.

Somewhat as previously described, a monorail hoist operating upon an I-beam 135 supported as by the steel posts 136 carries the loaded form to the place of storage and the empty forms from the place of storage back onto the conveying system about to enter the filling room. A route diagram 16 makes this operation entirely clear. The blocks are deposited under the cross or storage monorails 137, which may be of any desired numbers. It will of course be understood that I prefer to remove the den from the block at once after filling.

As will be clear from the immediately foregoing portion of this description, this modification of my process is particularly appropriate where practically continuous operation is desired. It will of course be understood that under this exemplification of my invention the linkage 120 may operate intermittently, but if desired if the mixer is sufficiently large and the movement of the linkage moderately slow, the operation can be literally continuous, instead of merely continuous in its effect. While one movable den is being filled within the filling room, a filled den with its contents is being moved to storage and an empty den is being placed upon the appropriate portion of the linkage.

Figures 17 to 20, inclusive, show another preferred form of my invention in which the walls of the den are movable in relation to each other and the blocks of superphosphate which are formed between them, these blocks then being bodily removed intact from between the den walls. Particularly for a new installation this structure has many advantages. Fewer and lighter dens are required. This form of my process well lends itself to rapid and large scale production.

In order to fill individual forms or dens 151, I may make use of any convenient mixing apparatus such as that previously described in connection with the other forms of my invention. This apparatus may conveniently be mounted above the dens for bodily movement in relation thereto as is conventional in the art. Since the mixing apparatus as such forms no part of my invention I am not again describing it in detail.

As shown in Figure 18, I may make use of units of nine dens each, although any convenient number may be employed. Under some circumstances each unit may consist of only one den. Each one of these dens may be filled at one operation or may take several batches as previously stated. I have found a one-ton den convenient but any other may be used as the particular mechanical arrangements of any plant may dictate. Each batch, however, should preferably be of a quantity sufficient to form the depth previously stated in connection with other forms of my invention described herein.

Each one of these dens may comprise a plurality of movable den walls 152. These walls may embody lower supporting projections 153 which, as clearly shown in Figure 19, serve to support the walls of dens upon T-beams 154 which extend between and are supported upon the walls 155 surrounding each unit of dens. Likewise assisting in this support, are the upper projections 157 from the walls 152 which ride upon supporting T-beams 158 in a similar manner. In order to prevent the material from falling between the den walls, angle irons 159 may be applied above the interstices as shown in Figures 18 and 19.

Each of the blocks of superphosphate rests upon a floor 161 of a car which forms the floor, as it were, of the dens, as shown in Figure 17. This floor may be supported by longitudinal I-beams 162 and cross beams 163. An axle 164 with wheels 165 may be journalled to the I-beams 162. Each of these cars is supported upon an elevator 166 which carries rails 167. This elevator may be raised and lowered by means of plunger shafts 168 operated by hydraulic jacks, not shown, or in any other desired way. As the car is lowered, the rails 167 are brought into line with the rails 169 which may lead to appropriate storage sheds so that the cars with the blocks B of superphosphate thereupon may be moved to any desired point for the completion of the curing operation and storage.

In order to "crack" the dens, that is to say, to separate the side walls 152 of the dens from the blocks B of superphosphate formed therewithin, any desired mechanism may be used, such as that shown in the drawings. Joining the contiguous walls of each den a plurality of toggles such as shown in detail in Figure 20 may be used. Each toggle may comprise two arms 171 rotatably movable upon pins 172 upon the walls 152. These arms may be fastened to each other and to an operating shaft 173 by means of a pin 174. It will thus be obvious that a downward movement of the shaft 173 will move the walls toward each other and away from the respective blocks while an upward movement of this shaft will separate the walls and bring them back into their closed or den-forming position.

To give such movement to the shaft 173, an external thread 176 may cooperate with an internally threaded collar 177 which by means of appropriate gearing 178 and 179 pinned to a rotatable shaft 181 may be operated by that shaft. It will thus be seen that rotation of the shaft 181 will move the walls 152 toward or away from each other in accordance with the direction of rotation of this shaft. To rotate the shafts 181 any convenient mechanism may be employed as for example, worm gears 183 and worm wheels 184, the latter being pinned to shaft 185. This shaft in turn may be operated in any convenient fashion as by a hand wheel 186 or a motor.

To operate the various similar toggle joints, other similar shafts may be employed, these shafts being connected by beveled gears 191 to the shafts 181. It will thus be readily seen that the rotation of the wheel 186 in one direction will "crack" all the dens and the rotation of the wheel in the other direction will re-form the dens. A very slight movement of each set of walls is all that is necessary.

The operation of this preferred form of my invention will be clear from the foregoing description and from the drawings. The wheel 186 is operated so that the walls of the dens are in closed position. The cars have been placed in position under the dens so that the floor 161 forms the floor of the dens. In any desired manner each of the dens is filled with the desired mixture. After each den has been filled, the wheel 186 will be rotated, thus "cracking" the nine dens and the car will be lowered so that blocks B of superphosphate clear the den walls. Thereupon the car will be moved onto the track 169 and hauled to a storage shed. While this cracking and removing process is being carried out upon one group of a plurality of groups of dens, another group will be in process of being filled. When this second group has been filled, the first car will have been removed from the first group of dens, another car substituted, and the dens re-formed ready for another filling operation. It will of course be understood that the number of the groups of dens may be indefinitely increased as the size of the operation warrants. Also, it will be understood that if desired, separate cars may be used for each individual den, if the capacity of each so warrants. In order to obtain an economical operation, two such groups are necessary, and any reasonable number of groups of dens with the necessary additional mixers may be added. It will of course be understood that the previous statements as to desirable proportion of acid and water as well as depth of filling of the dens also apply to this form of my invention, although irrespective of such elements of my invention, the above described variant of my invention will yield better results than have been previously obtained.

Figures 21, 22, 23 and 24 show another variant of my invention, accomplishing a portion of the above results, which is suitable for introduction into existing plants, particularly those in which the floor areas under cover are restricted and where outside ground is not available for track storage. In this exemplification of my invention, I move the den from the block without having bodily moved the block thereby, but this difference is a matter of economy and efficiency of operation rather than of principle.

As shown in the above figures, I mount both the mixing apparatus and the den upon a heavy movable framework which includes a chassis 201 from which supporting beams 202 extend upwardly tied by cross pieces 203 and supporting as upon I-beams 204 a platform 205 for mixing apparatus 206 and similar equipment, not shown and described in detail. This chassis 201 is supported upon wheels 207 which run upon rails 208.

The distance between rails, the length of the track and the height to which the mixture is to be formed, will be determined by the capacity of the mixer and the desired output. Moreover, a plurality of mixers may be mounted upon one movable framework. It is desirable, however, to arrange the equipment so that each batch is of the above described depth, that is to say, not less than three inches nor more than about three feet. I find a distance between rails of 22 feet and a height of about 20 feet desirable under some conditions, with a width of each block of about two feet, as will later appear. For simplicity in Figures 21 to 24 inclusive, however, I illustrate an operation which may produce blocks ten feet wide, ten feet high, and two in the other dimension.

The den itself—or that portion thereof which is not formed by the superphosphate itself—is mounted within the above described framework and between the rails. In the form shown in Figures 21 to 23 inclusive, it comprises two end members 210 and 211 pivoted as at 212 and 213 upon the under framing of the mixing platform 205 and movable by cables 214 attachable to winches 216 and 217. Two side walls 218 and 219 are "cracked" in any desired manner, preferably as previously described in connection with Figures 17 to 20 inclusive, and as shown in the fragmentary view designated as Figure 23. In the interest of simplicity, the previous description will not be repeated. It will be understood that when control shafts 220 are rotated as by a wheel 221 or a motor not shown, through the above described and indicated gearing and operative connections, the walls 218 and 219 will be moved away from each other, thus "cracking" the den, and when the wheel or motor is operated in the reverse direction, the walls will be moved toward each other and the den will be placed in condition again to be charged, after it has been moved to a new position as hereinafter described.

One track or any number may be used. If a plurality of tracks is used, the movable den and mixing structure may be moved from one to the other by means of a car 225 bearing rails 224 aligned with those 208 upon which the movable structure operates. This car by wheels 226 running upon a track 227 may be moved into a position so that the rails 224 thereupon are aligned with rails 230 forming another track on which the movable structure may also operate. At the end of this track the movable structure by a car 225' upon rails 227' may be shifted back to the track 207, or to any other track, depending upon the conditions applying to the operation at hand. Or, a continuous circular track or any desired manner of switching may be used. The track capacity preferably should be enough for at least forty-eight hours' production.

In beginning operation under this form of my invention, the movable structure is positioned adjacent the left hand portion of the track 208, as viewed in the drawings, and both end members 210 and 211 are closed and the side members 218 and 219 are likewise placed in closed or den-forming position. Thereupon, the den in filled in a conventional way, preferably by batches each of which fills the den to a depth of slightly less than two feet, for purposes of illustration. These batches may be the output of one or more mixers working in unison. As soon as the den has been filled, the end member 210 is raised, the side walls moved apart, and the car moved forwardly or to the right as viewed in the drawings. From this point onwardly, the block of superphosphate just previously formed serves as the end member of the den to define each of the blocks which is made thereafter. It will be noted, however, that the side members 218 and 219—see Figure 22—extend beyond the sides of the block so as to seal the edges against the escape of the slurry mass and the gases. This process is repeated, and succeeding blocks are made until the space between the rails 207 is filled with superphosphate. Thereupon the movable mixing and den-forming structure is placed upon the car 225, moved to the track 230, the end member 210 lowered, and the first block of the return trip made. After this block has been formed, the side walls are moved apart, the end member 211 is raised, and each previously formed block will serve as the end member for the following blocks.

As is readily apparent from Figures 21 and 23, the wall member 211, which carries a slotted sleeve or tubular member 211a, may be latched into block-forming position by the coaction of appropriate openings 211b in the bottom beam 2 of the carriage 219 with a locking bar 211c which is formed with an offset handle member 211d. After the wall 211 has been lowered into the position shown in Figure 21, the locking bar 211c by power applied to the protruding portion 211d thereof may be moved through the opening 211b thereby latching the wall to the carriage preparatory to the pouring operation. Similarly, the wall member 210 may be attached to or detached from its block forming position by the movement of a corresponding locking bar carried by a sleeve 210a through an opening 210. Corresponding latching mechanisms, not shown, may be employed upon the opposite edge of the walls 211 and 210.

It will be seen that the supporting structure for the mixing and den-forming equipment clears the blocks. The space between the tracks, if more than one track is used, is all that is not used for the storage of the material. It will be noted that I do not require any additional space for the production of the material, the production and the initial portion of the curing taking place at the same spot. Those skilled in the art who are familiar with existing plants will appreciate the advantage of this phase of my invention.

These series of blocks built in intimate contact with the adjoining blocks are allowed to remain untouched and undisturbed for partial curing. This point approximates that of maximum rigidity of the mass and maximum availability obtainable under high heat. I have found that unless the heat is decreased at this point, loss of availability will begin. The material is then removed to pile storage for the completion of the curing, the handling of the material incident to the removal being effective to reduce the high heat. During this handling the temperature ordinarily drops from 230 degrees Fahrenheit to about 130 degrees Fahrenheit. This handling with its subsequent cooling is necessary to prevent loss in availability and to cause the formation of the desired granular structure. As a result of this handling, however, the granulation of the resulting end product is less than that in the product made according to other forms of my invention, but under certain circumstances the economy of operations in plants which represent a large investment warrants this loss. It will be understood, however, that in availability, structure and mechanical condition, this product so made is superior to that made under conventional processes, although less desirable than in other forms of my invention.

Figure 24 shows a modification which I have found desirable under certain conditions. If I operate my movable den and mixing structure in one direction only for the production of superphosphate, I may construct one end wall 211' immovable relatively to the body of the structure and omit the end member altogether. In its place, I may employ a fixed abutment 235, as of concrete. The side walls 218' and 219' and the remainder of the structure may be as before, the rails 208' corresponding to the rails 208.

It will be understood that this process is indefinitely repeated. Only trackage sufficient for twenty-four hours is absolutely necessary, since sufficient curing can be accomplished in that time. After that time, the mass can be taken to other storage or treated as plant conditions warrant.

Figures 25, 26 and 27 show another variant of my invention, likewise particularly suited for introduction into existing plants. According to this form I provide means for dividing existing conventional dens into what in reality are smaller dens spaced by removable dividing walls. Thereupon the conventional dens become merely filling spaces. It will therefore be seen that I am able to pour batches as of the previously described size to form blocks each of which is sufficiently small so that the heat and pressure, after they have served their purpose, may be dissipated without the introduction of artificial means.

I show this preferred form of my invention as making use of four dens or filling rooms of the conventional type, here shown without dividing walls, which in a novel way I subdivide into a series of smaller dens, but it will be readily understood by those skilled in the art that any existing or convenient number of dens may be used. Under ordinary conditions, I much prefer the use of a number of conventional dens larger than four. These conventional dens or filling spaces are designated generally as 241, 242, 243, and 244.

Mounted as upon a car 246 with wheels 247 running upon a track 248 upon the top of these filling spaces I place a conventional mixer which may include rock receiving hopper 251, a scales hopper 252, and a mixing pan 253, into which an acid such as sulphuric acid of the desired strength as previously stated may be introduced. To subdivide each of the filling spaces and thereby form dens in which my invention may better be carried out, I provide a double collapsible and removable wall unit generally shown as 256, later described in detail and shown in Figure 27. To guide this wall unit as it is being lowered into the desired place within the conventional den which has now become merely a filling space, I make use of paired guideways 257. Adjacent the bottom of each of these guideways and of the collapsible wall units, when in position, I provide doors 258 which may be raised to any desired height to permit air to enter for a purpose later to be described. These doors are kept closed during filling. I provide a series of expeller fans, not shown, which through the openings 261 withdraw gases from the filling room, in conventional fashion. Each of these openings may be interconnected if desired with one large fan through a system of properly controlled piping in a conventional way. I operate this ventilating system only while the dens are being filled. The mixing pan 253 is gas-drained into the filling room through the pipe 262.

As shown in Figures 25 and 26, the mixing car is placed in position over the portion of the filling room generally indicated as 242 thus sealing its top. It has previously filled the unit dens occupying the portion of the filling room shown as 241. Now while the second filling space is being filled from the mixer, the blocks previously formed in the first portion are undergoing the curing process. The top of this space is unconfined after the mixing car has moved away. As shown, the mixer has placed successive batches in the two central dens of the space 242 completely filling these dens. After these dens have been completely filled, the material runs over the top thereof and into the dens placed upon each side of the two central dens, and gradually fills them. It will be understood of course that when these dens are filled, the material will run over their top in turn and into the two dens placed upon the outer sides of the filling space 242. At this point the filling operation of this portion of the filling room will have been completed, and the mixing car 246 will be ready to move over the portion of the filling room to the left as viewed in the drawings, and designated as 243. In preparation for this movement, the unit walls 256 which previously have been placed within the portion of the filling room designated as 241 have been moved by means presently to be described to the corresponding positions in the filling room 243. In view of the angle of repose of the slurry mass it is necessary to have these wall units 256 of different heights so that the material will readily flow from the central to the outer dens after the central dens have been filled. After the mixing car has filled the dens in the space 243, the blocks previously formed in the filling space 242 will be sufficiently solidified so that the wall units in use there may be removed therefrom and placed in position in space 244. By this time the blocks in space 241 will have been sufficiently cured for removal in any desired way from such space. Such removal may be carried out while the mixing car is filling space 244. After such space has been filled, the mixing car may be moved back to space 241 and the process continued indefinitely and in effect continuously. Enough filling spaces must be supplied to take care of 36 hours' production.

To move the unit walls 256 from one position to another, a conventional crane may be provided. A hook 264 is attached to a cable 265 which is wound upon a winch 266 operated by a motor 267 mounted upon a car 268 which runs upon a track 269 depending as by the hangers 270 from an I-beam 271 which through the wheels 272 in turn runs upon rails 273 supported by uprights 274 and driven as by motors 276. In certain of the subjoined claims, I speak of causing relative movement between the walls of the den and the block, or make like statements. It will of course be understood that such movement affects only those of the walls of the den which must be moved to carry out the stated operation. Other of the walls may remain in fixed relation to the block.

A method by which I may "crack" the wall units 256 is shown in Figure 27. The "cracking" operation moves the two walls toward each other thus freeing them from the adjacent blocks of superphosphate and rendering them free to be removed. Each individual wall 281 is joined to the other of its unit by two sets of toggle joints, the first comprising the arms 282 movably mounted in respect to each other, each wall, and a lifting rod 283, which terminates in a ring 284 in which the hook 264 may be applied. It will be readily understood that when the winch 266 is moved to wind up the cable 265 the walls 281 are brought together and then raised together. In order to separate the sides as they are again being placed in operative position, another toggle comprising the arms 285 movably mounted in relation to each other, each wall 281, and the rod 286 is provided. This rod 286 likewise terminates in a ring 286', into which the hook 264 may be placed. After the double wall unit has been placed into position in its relatively contracted form, a workman removes the hook 264 from the ring 284 and places it in the ring 286'. Upon the upward movement of the cable 265, the rod 286 will be moved upwardly thereby forcing the sides apart. It will be readily understood that the toggle comprising the arms 285 will be so arranged that they will never reach a dead center or horizontal position, while the toggle 282 is so arranged that it reaches such position when the walls are expanded to their operative station thereby locking them against the pressure of the mass. It will of course be understood that as many interconnected toggles are supplied as is necessary, all being operated by the rods 283 and 286.

In order to guide the wall unit structure into operative position within the filling spaces, the guiding members 257 are composed of two structures extending a very short distance within the filling spaces from the walls thereof 288, and including flaring mouthed portions 289, the divergent angles of which receive the bottom of the wall unit and guide it into position as it is being lowered. In order to prevent the superphosphate during the pouring from falling within the space between the walls, a cap 291 is applied to the top of each unit wall, this cap either being attached to the rod 283 for movement therewith or being removable.

If desired, means additional to the toggle 282 may be supplied in any conventional way to hold each unit wall in extended or operative position and, if desired, means additional to the weight of the walls 281 may be provided to prevent the upward movement of the unit walls until the wall members have been moved into the extended position as the wall units are being initially placed into operative position within the filling spaces.

It will be understood that after the walls have been removed the spaces previously occupied thereby form excellent ventilating shafts which merely make use of the natural force there present to accelerate the natural cooling and drying process, the ventilating doors 258 being opened to any desired extent.

In extremely cold weather in the north, difficulty has arisen when the blocks are individually stored out of doors in open sheds, but it will be readily understood that the form of my invention shown hereinabove is free from any trouble of this sort since the heat of the blocks in close proximity one to the other is sufficient to prevent too rapid cooling, even in the coldest of weather, yet this arrangement permits natural cooling and drying to take place with sufficient rapidity to accomplish the hereinabove stated desirable and novel results.

For many years attempts have been made to mix nitrogen-bearing materials or potash-bearing materials, or both, with ground phosphate rock and acid in order to make a mixed fertilizer. So far as I am aware, these attempts in the past have always met with failure, not so much because of chemical difficulties as because of physical diffculties. The resulting mass has been mucid or gummy or otherwise difficult to handle and impossible to place in proper condition for drilling, without a second puddling and drying or other artificial granulation. According to my invention, however, these difficulties are largely overcome. I find it possible to mix one or a plurality of other fertilizing materials in the pan with the phosphate rock and acid and I handle the resulting mass as I handle acidulated phosphate rock alone. The resulting product is granular and requires no further or different handling than does the superphosphate alone. Each individual granule, according to this exemplification of my invention, contains both the phosphorus and the nitrogen or potash or the phosphorus and what other fertilizing element or elements may have been employed. The advantages of having all these fertilizing elements in one granule will of course be readily understood by those skilled in the art.

When mixing other fertilizer ingredients with the acid and the phosphate rock, I generally much prefer virtually to complete the mixing operation before I add the additional ingredient or ingredients. If potash, for example, is added to the pan early in the mixing, hydrochloric acid is formed, which becomes a gas and is partially lost. Similarly, if I add nitrogen-bearing material early in the mixing operation, the resulting acidulating process of the rock is much hampered. I have discovered, however, that if I add either potash or nitrogen-bearing material to the pan after the mixing has become largely completed, no harm is done, and I secure a mixed fertilizer at one operation.

I may use any desired potash-bearing material, such as sulphate of potash, muriate of potash, kainit, or manure salts. I may use any desired nitrogen-bearing material such as sulphate of ammonia, ammonium nitrate or nitric acid. If desired, I may use nitrogen-bearing material in the form of low grade organic substance, such as hair, tankage, leather scraps, or wool waste. Such material since it needs acidulation to increase its availability can well be introduced in the mixture early in the mixing process.

So far as I am aware, the highest temperature previously obtained without artificial means in a mass of superphosphate within a conventional den is 220° Fahrenheit. By my process, I may so manipulate the mass of material that the temperature reaches 235° Fahrenheit and remains near that point for a sufficient time to secure the results which I state. The temperatures which I state in this paragraph and in the subjoined claims are those taken with an ordinary thermometer thrust into the mass and then removed. Temperatures taken with a recording thermometer moulded into the mass obviously will run materially higher, often five degrees or more. In the curing process, pressure is as or more important than temperature. Temperature and pressure move together. I can measure temperature, but I can not measure the pressure within the intercellular structure without destroying the structure and allowing the pressure to escape. Therefore, temperature is to be considered a measure of pressure as well as of heat.

According to my process, I secure what I term superphosphate in pellet form. I have already defined "pellet". By "superphosphate in pellet form" I mean superphosphate of which approximately two-thirds will not pass through a 16-mesh screen.

It is of course true that in the past with equipment which has proved expensive and inefficient and operating with small batches, it has been possible to reduce the so-called curing time to a comparatively few hours. Thereupon the material has been in mechanical condition for further handling but the percentage of availability was comparatively low. This "curing" obviously does not meet my definition given hereinabove. Under my method, I reduce the curing time previously possible under natural means and am enabled to operate economically and efficiently.

As will be understood from a reading of the foregoing portion of this specification by those skilled in the art, I accomplish my improved results by manipulating the materials so as to take advantage of natural processes. While others have made use of expensive and complicated processes which are carried out with expensive and complicated equipment, such as autoclaves, pumps, driers, dusting machines, and steam, I utilize the mass of material itself handled in accordance with the above described discoveries. My dens or forms are simple and relatively inexpensive. I may use conventional mixers. The size of each batch is preferably entirely conventional, but by restricting the surface area of the batch when poured I accomplish novel results. I do not depend upon mixing in a form to secure any of the results of my process. I may readily adapt the size of the dens to the equipment which is existing in any plant. I much decrease the time of curing over that heretofore possible under any natural means. The resulting product has a higher degree of availability than the product made in accordance with previous expensive artificial means and processes. I secure a product in pellet form and without re-puddling or any special operation.

The advantages of my invention will be evident from the foregoing portions of this description, the attached drawings, and the subjoined claims.

I claim:

1. A process for manufacturing superphosphate comprising mixing phosphate rock and an acid, so determining the amount of each batch that when it is poured in a confined space it has sufficient depth to increase the temperature of its mass and the pressure therewithin above that prevailing when the mass is poured by confining within its intercellular structure the heat and pressure due to the chemical reaction and to retain a relatively large portion of the moisture and has insufficient weight to injure the porous structure normally created therein by said chemical reaction, pouring said batches successively into a den thereby forming a layered block of superphosphate therewithin, increasing said temperature and pressure solely by said depth of each of said pourings, causing relative movement between the walls of said den and said block of superphosphate, permitting said heat to be dissipated by natural means after it has served its purpose in the chemical reaction, and thereafter leaving said block intact and untreated until the curing is complete.

2. A process for manufacturing superphosphate comprising mixing phosphate rock and an acid, so determining the amount of each batch that when it is poured in a confined space it has sufficient depth to increase the temperature of its mass and the pressure therewithin above that prevailing when the mass is poured by confining within its intercellular structure the heat and pressure due to the chemical reaction and has insufficient depth for the weight of said batch to inhibit the creation of the porous structure normally resulting therein from said chemical reaction, pouring said batches successively into a den thereby forming a layered block of superphosphate therewithin thereby still further confining the gases caused by the chemical reaction by the positioning of each of said successive layers of superphosphate upon the preceding layer thereby further increasing said temperature and pressure, causing relative movement between the walls of said den and said block of superphosphate, and leaving said block intact and untreated until the curing is complete.

3. A process for manufacturing superphosphate comprising mixing phosphate rock and an acid, so determining the amount of each batch that when it is poured in a confined space it has sufficient depth to increase the pressure therewithin and the temperature of the mass to above 225° Fahrenheit by confining within the intercellular structure the pressure and heat due to the chemical reaction, pouring said batches successively into a den thereby forming a layered block of superphosphate therewithin, increasing said temperature and pressure solely by said depth of each of said pourings, causing relative movement between the walls of said den and said block of superphosphate, permitting said heat to be dissipated by natural means after it has served its purpose in the chemical reaction, and thereafter leaving said block intact until the curing is complete.

4. A process for manufacturing superphosphate comprising mixing phosphate rock and an acid, so determining the amount of each batch that when it is poured in a confined space it has sufficient depth to increase the temperature of the mass and the pressure therewithin above that prevailing when the mass is poured by confining within its intercellular structure the heat and pressure due to the chemical reaction, successively pouring each of said batches into a den, causing relative movement between the walls of the den and the block of superphosphate formed therewithin, and thereafter leaving the block without further treatment until the curing is complete.

5. A process for manufacturing superphosphate comprising mixing phosphate rock and an acid, so determining the amount of each batch that when it is poured it has a depth of over approximately three inches thereby increasing the temperature of the mass and the pressure therewithin by confining within its intercellular structure the heat and pressure due to the chemical reaction taking place therein and such depth being less than three feet the mass thereby having insufficient weight to injure the porous structure created therein by said chemical reaction, causing relative movement between the walls of the den and the block formed therewithin, and leaving the block without further treatment until the cure is complete.

6. A process for manufacturing superphosphate characterized by mixing phosphate rock and an acid in a batch of such an amount that when it is poured into a confined space the resulting mass will have sufficient depth to build up the heat and the pressure due to the chemical reaction taking place therein to such degree that the temperature within said mass will exceed 225 degrees Fahrenheit without the mixture being subjected to any heat increasing and heat retaining instrumentalities other than such chemical reaction and the insulating qualities of the mass itself, and leaving the mass untouched and untreated until it has cooled to approximately atmospheric temperature.

7. A process for manufacturing superphosphate characterized by mixing phosphate rock and an acid, pouring said mixture in a confined space in a batch of such an amount that it has sufficient depth to build up the heat and the pressure due to the chemical reaction taking place therein to such degree that the temperature within the mass will exceed 225 degrees Fahrenheit without the mixture being subjected to any heat increasing and heat retaining instrumentalities other than such chemical reaction and the insulating qualities of the mass itself, and thereafter permitting the mass to cool relatively rapidly and without reheating.

8. A process for manufacturing superphosphate comprising mixing phosphate rock and an acid, so determining the amount of each batch that when it is poured upon a support in a confined space it has sufficient depth to confine within itself a sufficient portion of the heat and gases which are the product of the chemical reaction to raise the temperature of the mass above 225 degrees Fahrenheit, pouring the batch upon a support in a confined space, and leaving the batch without further treatment until curing is complete.

9. A process for manufacturing superphosphate comprising mixing phosphate rock and an acid in a batch of sufficient quantity to form a mass of not less than approximately three inches in depth nor more than approximately three feet in depth, pouring said batch upon a support whereon it forms a mass of a depth within said limits, pouring other similar batches upon said mass, and disintegrating the block so formed by the successive pouring of said batches after the superphosphate is cured.

10. A process for manufacturing superphosphate comprising mixing phosphate rock and an acid in a batch of sufficient quantity to form a mass of more than approximately three inches in depth after the pouring thereof, pouring said batch upon a support whereon it forms a mass of said depth, and disintegrating the block so formed after the curing of said superphosphate has been completed.

11. A process for manufacturing superphosphate comprising mixing phosphate rock and an acid, so determining the amount of each batch that when it is poured upon a support in a confined space it has sufficient depth to increase the temperature of its mass and the pressure therewithin above that prevailing when the mass is poured by confining within its intercellular structure the heat and the pressure due to the chemical reaction, and leaving the batch without further treatment until curing is complete.

12. A process for manufacturing superphosphate comprising mixing phosphate rock and an acid and pouring in a confined space upon a support successive batches of such mixture each of which has sufficient depth to increase the temperature of the batch and the pressure therewithin above that prevailing when the mass is poured by confining within its intercellular structure the heat and pressure due to the chemical reaction taking place therein and insufficient weight to inhibit the creation of the porous structure normally resulting from said chemical reaction.

13. A process for manufacturing superphosphate comprising mixing phosphate rock and an acid, limiting each batch so that when it is poured in a confined space the resulting mass will have sufficient depth to confine the heat and gases appearing within the intercellular structure due to the chemical reaction thereby building up such heat and pressure above that prevailing when the mass is poured, and limiting the number of such batches so that the resulting block will be of such size that such heat and pressure after they have served their purpose in the chemical reaction are readily dissipated without the use of artificial means.

14. A process for manufacturing superphosphate comprising mixing phosphate rock and an acid, so determining the amount of each batch that when it is poured the resulting mass will have sufficient thickness to build up the heat and the pressure due to the chemical reaction taking place therein to such degree that the temperature within the mass will exceed 225 degrees Fahrenheit without the mass being subjected to any heat increasing and heat retaining instrumentalities other than such chemical reaction and the insulating qualities of the mass itself, leaving said block intact until the external surfaces of said block have cooled to approximately atmospheric temperature, moving said block into close proximity to other such blocks, and maintaining said blocks in such proximity until said blocks have dried and become hard.

15. A process for manufacturing superphosphate which comprises mixing phosphate rock and an acid, pouring successive batches thereof into a floorless den while said den rests upon a floor, separate from said den, thereby forming a block therewithin, said block when formed being of such size that it will cool relatively rapidly, leaving said den upon said floor until the block of superphosphate therewithin has solidified, moving said den with the block therewithin to a point relatively remote from said floor and the point at which the den has been filled, removing the den from the block, and leaving the block untouched and untreated until it has cooled to approximately atmospheric temperature.

16. A process for manufacturing superphosphate which comprises mixing phosphate rock and an acid, pouring successive batches thereof into a den with removable walls thereby forming a block, said block when formed being of such size that it will cool relatively rapidly, moving said den with the block therewithin to a point relatively remote from the point at which the den has been filled, causing relative movement between the walls and the block, and leaving the block untouched and untreated until it has cooled to approximately atmospheric temperature.

17. A process for manufacturing superphosphate which comprises mixing phosphate rock and an acid, pouring the mixture into a den thereby forming a block, retaining during the initial reaction period the heat caused by the chemical reactions, permitting the rapid and continuous decrease of said heat during the succeeding period in which the phosphoric acid is operative to complete the curing process wherein heat is of no material value and the decrease of said heat results in the production of a granular superphosphate, and maintaining the block intact and untreated until it has cooled to approximately atmospheric temperature.

18. A process for manufacturing superphosphate which comprises supplying a den which has a plurality of floors each movable in respect thereto and adapted for successive use in connection therewith, mixing ground phosphate rock and an acid, pouring said mixture into said den with one of said floors in place thereby forming a block of superphosphate upon said floor, said block being of such size that it will cool relatively rapidly, moving said floor relatively to said den with said block of superphosphate thereupon and to a relatively remote point, placing another floor within said den, and forming another block of superphosphate thereupon while leaving said previously recited block upon said first mentioned floor until the block has cooled to approximately atmospheric temperature.

19. A process for manufacturing superphosphate characterized by placing a floorless den upon a car, filling the den with a mixture of ground phosphate rock and an acid thereby forming a block of superphosphate, said block being of such size that it will cool relatively rapidly, removing the den from the car thereby leaving the block upon the car, and leaving the block upon the car and intact until the block has cooled to approximately atmospheric temperature.

20. A process for manufacturing superphosphate which comprises placing removable dividing walls within a filling space, mixing ground phosphate rock and an acid in successive batches, so determining the amount of each batch that when it is poured it has a depth of over approximately three inches thereby increasing the temperature of the mass and the pressure therewithin by confining within its intercellular structure the heat and pressure due to the chemical reaction taking place therein and such depth being less than three feet, the mass formed thereby having insufficient weight to injure the porous structure created therein by said chemical reaction, pouring said batches successively into each of a plurality of dens so formed between each pair of said walls, removing said walls after the material so poured has solidified, and leaving the block so formed without further treatment until the cure is completed.

21. A process for manufacturing superphosphate which comprises placing removable dividing walls within a filling space, mixing groun phosphate rock and an acid, pouring said mixture into each of a plurality of dens formed between each pair of said walls, and removing said walls after the material so poured has solidified.

22. A process for manufacturing superphosphate which comprises placing removable dividing walls within a filling space, mixing ground phosphate rock and an acid, pouring successive batches thereof into one of the plurality of dens so formed within said filling space and thereafter pouring successive batches into another of said dens, and removing said walls after the material so formed has solidified.

23. A process for manufacturing superphosphate which comprises forming a plurality of separate and adjacent dens with common walls, the walls of said separate dens being progressively shortened to a degree commensurate with the angle of repose of the slurry mass of newly mixed superphosphate, mixing ground phosphate rock and an acid to form such a mass, pouring such slurry mass into one of said dens having relatively high walls until said den is full, continuing said pouring operations so that the slurry mass overflows at least one of said high walls and thereupon fills another and adjacent den, the relatively distant wall of which is relatively less high than the walls of said first mentioned den, and continuing said pouring operations until said slurry mass overflows said last mentioned wall and fills a den bounded thereby.

24. A process for manufacturing superphosphate which comprises separating a filling space into a plurality of separate dens by removable dividing walls, mixing ground phosphate rock and an acid, pouring said mixture into said dens, removing said walls from between the blocks so formed, and admitting air to the space formerly occupied by said walls, thereby forming a draft which assists in the cooling of the blocks.

25. A process for manufacturing superphosphate which comprises separating a filling space into a plurality of dens by removable dividing walls, mixing ground phosphate rock and an acid, pouring said mixture into said dens in such quantity that the mass thereof causes the heat and gas due to the chemical reaction between the rock and the acid to be increased to at least approximately 225° Fahrenheit, and removing said removable walls after the material has solidified thereby permitting the relatively rapid cooling of the blocks formed between the walls.

26. A process for manufacturing superphosphate comprising mixing ground phosphate rock and an acid, pouring an amount of such mixture into a den which will form a block therewithin of such weight and shape that the block will be of sufficiently great size to retain during the initial period the heat generated therewithin by the internal chemical reactions by the insulating qualities of the block so formed and of insufficient size to prevent the relatively rapid cooling of the block thereafter by natural means, causing relative movement between the den and said block, leaving said block intact and without treatment until the block has cooled to approximately atmospheric temperature, and thereafter disintegrating said block.

27. A process for manufacturing a chemically mixed fertilizer comprising mixing ground phosphate rock, a potash-bearing material, and an acid, pouring such mixture into a den with removable walls thereby forming a block therewithin, said block when formed being of such size that it will cool relatively rapidly, moving said den with the block therewithin to a point relatively remote from the point at which the den has been filled, causing relative movement between the walls of the den and said block, leaving said block intact and untreated until the block has cooled to approximately atmospheric temperature, and thereafter disintegrating said block.

28. A process for manufacturing a chemically mixed fertilizer comprising mixing ground phosphate rock, a nitrogen-bearing material, and an acid, pouring such mixture into a den with removable walls so that it forms a block therewithin, said block when formed being of such size that it will cool relatively rapidly, moving said den with the block therewithin to a point relatively remote from the point at which the den has been filled, causing relative movement between the walls of the den and said block, leaving said block intact and untreated until the block has cooled to approximately atmospheric temperature, and thereafter disintegrating said block.

29. A process for manufacturing a chemically mixed fertilizer comprising mixing ground phosphate rock, a nitrogen-bearing material, a potash-bearing material, and an acid, pouring said mixture into a den with removable walls so that it forms a block therewithin, said block when formed being of such size that it will cool relatively rapidly, moving said den with the block therewithin to a point relatively remote from the point at which the den has been filled, causing relative movement between the walls of the den and said block, leaving said block intact and untreated until the block has cooled to approximately atmospheric temperature, and thereafter disintegrating said block.

30. A process for manufacturing a mixed fertilizer comprising mixing ground phosphate rock, an acid and a nitrogen bearing material, so determining the amount of each batch that it has a depth of over approximately three inches thereby increasing the temperature of the mass and the pressure therewithin by confining within its intercellular structure the heat and pressure due to the chemical reaction taking place therein and such depth being less than three feet, the mass thereby having insufficient weight to injure the porous structure created therein by said chemical reaction, causing relative movement between the walls of the den and the block formed therewithin, and leaving the block without treatment until the cure is complete.

31. A process for manufacturing a mixed fertilizer comprising mixing ground phosphate rock, an acid and a potash bearing material, so determining the amount of each batch that it has a depth of over approximately three inches thereby increasing the temperature of the mass and the pressure therewithin by confining within its intercellular structure the heat and pressure due to the chemical reaction taking place therein and such depth being less than three feet, the mass thereby having insufficient weight to injure the porous structure created therein by said chemical reaction, causing relative movement between the walls of the den and the block formed therewithin, and leaving the block without treatment until the cure is complete.

32. A process for manufacturing a mixed fertilizer comprising mixing ground phosphate rock, a potash bearing material, and a nitrogen bearing material, an acid, so determining the amount of each batch that it has a depth of over approximately three inches thereby increasing the temperature of the mass and the pressure therewithin by confining within its intercellular structure the heat and pressure due to the chemical reaction taking place therein and such depth being less than three feet, the mass thereby having insufficient weight to injure the porous structure created therein by said chemical reaction, causing relative movement between the walls of the den and the block formed therewithin, and leaving the block without treatment until the cure is complete.

33. A process for manufacturing a chemically mixed fertilizer comprising mixing ground phosphate rock and an acid until such mixture is substantially complete, at that point adding a potash-bearing material, continuing the mixing operation for a relatively short length of time merely sufficient to incorporate the potash-bearing material in the previous mixture, pouring the mixture into a den with removable walls, thereby forming a block therewithin, said block when formed being of such size that it will cool relatively rapidly, moving said den with the block therewithin to a point relatively remote from the point at which the den has been filled, causing relative movement between the walls of the den and said block, leaving said block intact until the block has cooled to approximately atmospheric temperature, and thereafter disintegrating said block.

34. A process for manufacturing a chemically mixed fertilizer comprising mixing ground phosphate rock and an acid and continuing such mixing operation until the mixture is substantially complete, at that point adding a nitrogen-bearing material to the mixture, continuing the mixing operation for a relatively short length of time merely sufficient to incorporate said nitrogen-bearing material in the previous mixture, pouring the mixture into a den with removable walls thereby forming a block therewithin, said block when formed being of such size that it will cool relatively rapidly, moving said den with the block therewithin to a point relative remote from the point at which the den has been filled, causing relative movement between the walls of the den and said block, leaving said block intact until it has cooled to approximately atmospheric temperature, and thereafter disintegrating said block.

35. A process for manufacturing a chemically mixed fertilizer comprising mixing ground phosphate rock and an acid and continuing such mixing operation until the mixture is substantially complete, at that point adding a potash-bearing material and a nitrogen-bearing material to the mixture and further continuing the mixing operation for a relatively short length of time merely sufficient to incorporate said potash-bearing material and said nitrogen-bearing material into the previous mixture, pouring the mixture into a den with removable walls thereby forming a block therewithin, said block when formed being of such size that it will cool relatively rapidly, moving said den with the block therewithin to a point relatively remote from the point at which the den has been filled, causing relative movement between the walls of the den and said block, leaving said block intact until the block has cooled to approximately atmospheric temperature, and thereafter disintegrating said block.

36. As a new article of manufacture, a pelleted superphosphate composed of individual pellets each of which consists of a number of granules of cured superphosphate held together by the material itself in the form of a porous structure the porosity of which extends with substantial uniformity throughout the mass and to the surface of the pellet.

37. As a new article of manufacture, a pelleted superphosphate composed of pellets substantially all of which are too large to pass through a sixty mesh screen, each of said pellets consisting of a number of granules of cured superphosphate held together in the form of a porous structure the porosity of which extends with substantial uniformity throughout the mass and to the surface of the pellet.

38. As a new article of manufacture, a pelleted superphosphate approximately two-thirds of which will not pass through a sixteen mesh screen, each of said pellets consisting of a number of granules of cured superphosphate held together in the form of a porous structure the porosity of which extends with substantial uniformity throughout the mass and to the surface of the pellet.

39. As a new article of manufacture, a pelleted superphosphate composed of individual pellets each of which is an agglutination of granular particles and each of which is a porous structure the porosity of which extends with substantial uniformity throughout the mass and to the surface of the pellet.

40. As a new article of manufacture, a pelleted fertilizer composed of individual pellets each of which consists of a number of granules each a mixture of a plurality of fertilizer materials including superphosphate and held together by the materials themselves in the form of a porous structure the porosity of which extends with substantial uniformity throughout the mass and to the surface of the pellet and deriving its porosity from the superphosphate.

41. As a new article of manufacture, a pelleted phosphatic fertilizer composed of individual pellets each of which consists of a number of granules each a mixture of superphosphate and a nitrogen bearing material held together by the materials themselves in the form of a porous structure the porosity of which is derived from the superphosphate and extends with substantial uniformity throughout the mass and to the surface of the pellet.

42. As a new article of manufacture, a pelleted fertilizer composed of individual pellets each of which consists of a number of granules each a mixture of superphosphate and a potash bearing material and held together by the materials themselves in the form of a porous structure the porosity of which is derived from the superphosphate and extends with substantial uniformity throughout the mass and to the surface of the pellet.

43. As a new article of manufacture, a pelleted fertilizer composed of individual pellets each of which consists of a number of granules each a mixture of materials bearing potash and nitrogen and superphosphate held together by the materials themselves in the form of a porous structure the porosity of which is derived from the superphosphate and extends with substantial uniformity throughout the mass and to the surface of the pellet.

LEROY HENRY FACER.